US011416028B1

(12) United States Patent
Kamepalli et al.

(10) Patent No.: US 11,416,028 B1
(45) Date of Patent: Aug. 16, 2022

(54) DOCK TO BRIDGE VENDOR DEFINED MESSAGES BETWEEN DEVICES

(71) Applicant: DELL PRODUCTS, LP, Round Rock, TX (US)

(72) Inventors: Srinivas Kamepalli, Austin, TX (US); Marcin Nowak, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/232,497

(22) Filed: Apr. 16, 2021

(51) Int. Cl.
| | |
|---|---|
| *G06F 1/16* | (2006.01) |
| *G06F 1/3234* | (2019.01) |
| *G06F 13/38* | (2006.01) |
| *G06F 13/40* | (2006.01) |

(52) U.S. Cl.
CPC ............ *G06F 1/1632* (2013.01); *G06F 1/325* (2013.01); *G06F 13/385* (2013.01); *G06F 13/4081* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 10,268,616 B2 | 4/2019 | Montero et al. | |
| 2020/0259805 A1 | 8/2020 | Grobelny et al. | |
| 2021/0365070 A1* | 11/2021 | Hsia | ...................... G06F 13/385 |

* cited by examiner

*Primary Examiner* — Idriss N Alrobaye
*Assistant Examiner* — Dayton Lewis-Taylor
(74) *Attorney, Agent, or Firm* — Larson Newman, LLP

(57) ABSTRACT

An information handling system includes a first device, a host device, and a dock. The dock communicates with the first device over a first physical communication link, and with the host device over a second physical communication link. The dock receives a vendor defined message from the host device over the second physical communication link. In response to the first device being a destination device for the vendor defined message, the dock converts the vendor defined message to a second message having a different protocol as compared to the vendor defined message and designates an embedded controller of the dock as a virtual destination for the second message. In response to the first device being the destination device, the embedded controller regenerates the second message as a second vendor defined message and provides the second vendor defined message to the first device via the second physical communication link.

20 Claims, 5 Drawing Sheets

US 11,416,028 B1

DOCK TO BRIDGE VENDOR DEFINED MESSAGES BETWEEN DEVICES

FIELD OF THE DISCLOSURE

The present disclosure generally relates to information handling systems, and more particularly relates to dock to bridge vendor defined messages between devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a first device, a host device, and a dock. The dock may communicate with the first device over a first physical communication link, and may communicate with the host device over a second physical communication link. The dock may receive a vendor defined message from the host device over the second physical communication link. The first device may be designated as the recipient of the vendor defined message. In response to the first device being a destination device for the vendor defined message, the dock may convert the vendor defined message to a second message having a different protocol as compared to the vendor defined message and designate an embedded controller of the dock as a virtual destination for the second message. The dock may provide the second message to the embedded controller via the first virtual link. In response to the first device being the destination device, the dock may regenerate the second message as a second vendor defined message and provide the second vendor defined message to the first device via the second physical communication link.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
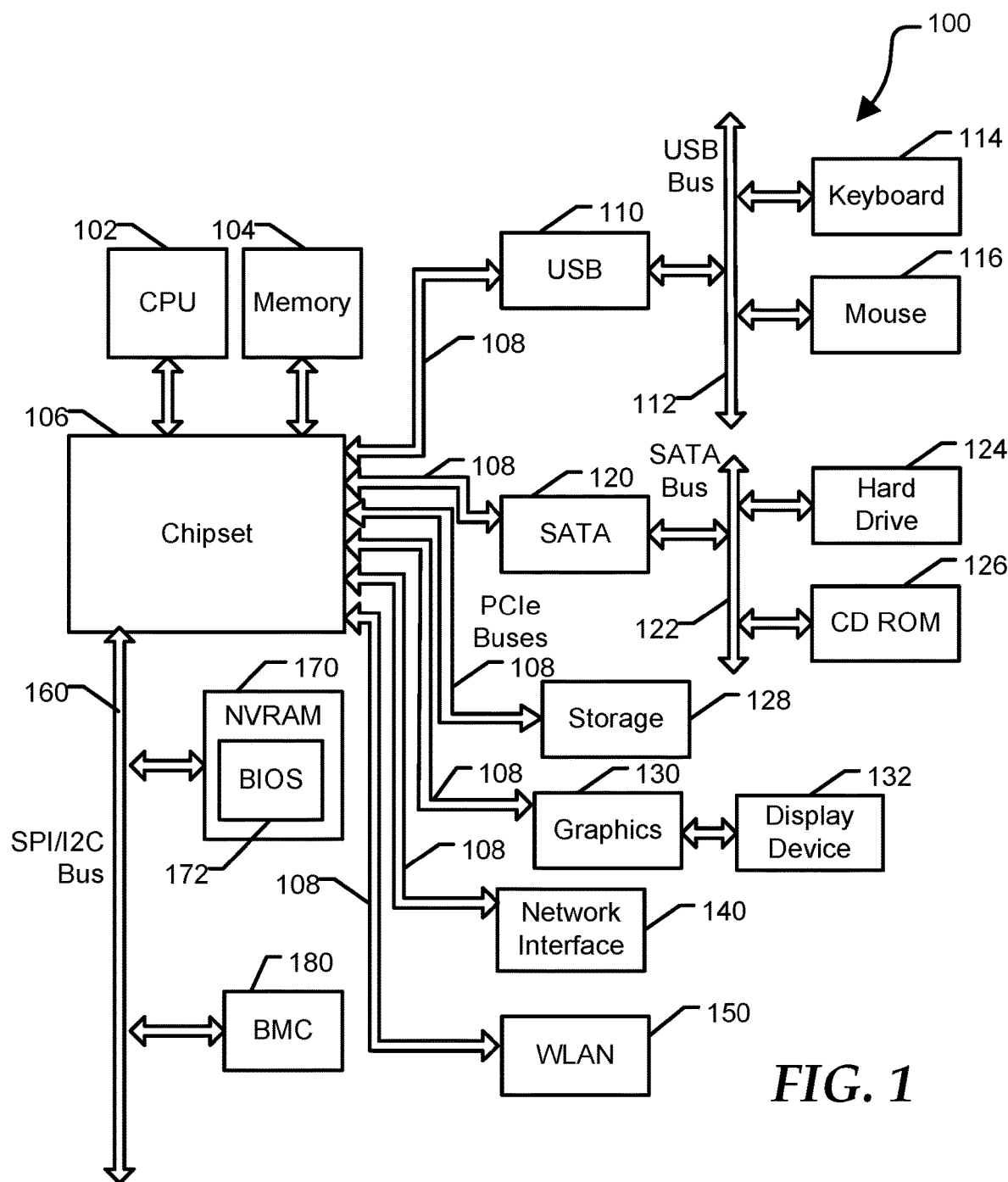
FIG. 1 is a block diagram of a general information handling system according to at least one embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
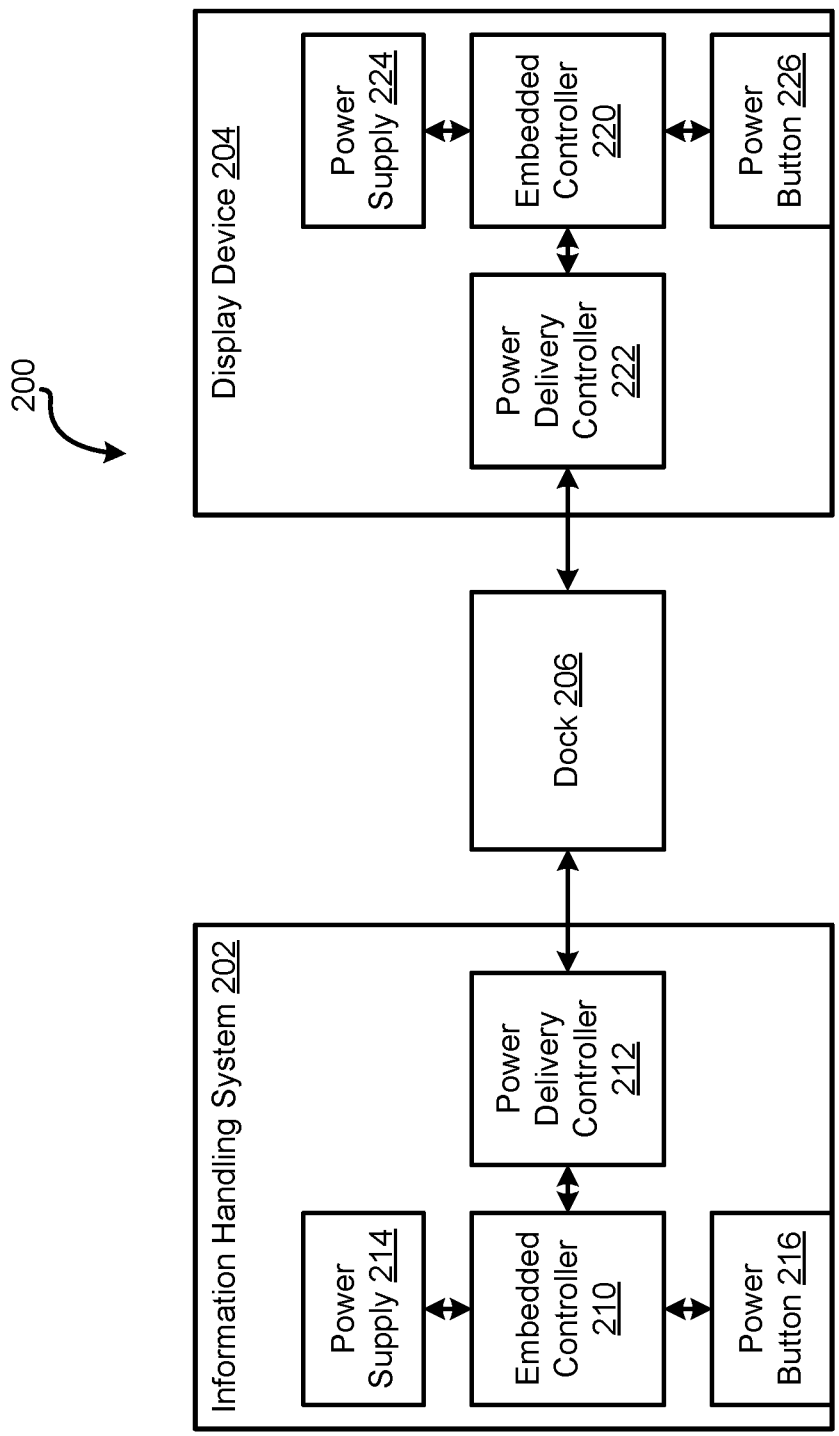
FIG. 2 is a block diagram of a portion of a system including an information handling system in communication with a display device via a dock according to at least one embodiment of the disclosure.

In an example, information handling system 100 may be any suitable device including, but not limited to, information handling system 202, display device 204, and dock 206 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

FIG. 2 illustrates a portion of a system 200 including an information handling system 202 in communication with a display device 204 via a dock 206 according to at least one embodiment of the disclosure. In certain examples, system 200 may be defined as an information handling system, which in turn includes one or more additional information handling systems, such as information handling system 202, display device 204, and dock 206. Information handling system 202 may further be referred to herein as a host device to communication with one or more additional devices via dock 206. Information handling system 202 includes an embedded controller 210, a power delivery controller 212, a power supply 214, and a power button 216. In an example, information handling system 202 may include additional components over those shown in FIG. 2 without varying from the scope of this disclosure. Display device 204 includes an embedded controller 220, a power delivery controller 222, a power supply 224, and a power button 226. In an example, display device 204 may include additional components over those shown in FIG. 2 without varying from the scope of this disclosure. Dock 206 may include one or more suitable component to bridge communication between information handling system 202 and display device 204 as will be described with respect to FIGS. 3 and 4 below. In certain examples, embedded controller 210 and 220 may be any suitable type of processor without varying from the scope of this disclosure.

During operation, power supply 214 may provide power to one or more components of information handling system 202 including, but not limited to, embedded controller 210 and power delivery controller 212. In an example, embedded controller 210 may enter a low power mode when an action has not been performed within information handling system 202 for a particular amount of time or if power button 216 provides a shut down or sleep state signal to the embedded controller. If embedded controller 210 is in the low power mode and an individual presses power button 216, the power button may provide a wake signal to embedded controller 210.

Based on the wake signal, embedded controller 210 may provide a wake signal to display device 204 via dock 206. For example, power delivery controller 212 may receive the wake signal from embedded controller 212 and the signal may identify display device 204 as a destination device for the wake signal. Power delivery controller 212 may provide the wake signal to dock 206 via a port of information handling system 202. In response to receiving the wake signal, dock 206 may bridge the signal to display device 204 via a port of the display device. In an example, power delivery controller 222 may receive the wake signal and may provide the signal to embedded controller 220, which in turn may wake from a low power mode based on the reception of the signal.

In an example, embedded controller 220 of display device 204 may wake from a low power mode or deep sleep state in manners other than receiving the wake signal from information handling system 202. For example, if embedded controller 220 is in the low power mode and an individual presses power button 226, the power button may provide a wake signal to the embedded controller. In response to the wake signal, embedded controller 220 may enter a higher power state and being consuming power from power supply 224. In an example, embedded controller 220 may stop consuming power from power supply 224 and enter a low power mode when an action has not been performed within display device 204 for a particular amount of time or if power button 226 provides a shut down or sleep state signal to the embedded controller.

In certain examples, information handling system 202 may be directly connected to dock 206 via any suitable physical communication link, such as a universal serial bus type C (USB-C) communication cable or link. Display device 204 may also be directly connected to dock 206 via any suitable physical communication link, such as a USB-C communication cable or link. In an example, a USB-C connector may communicate data in different protocols including, but not limited to, USB protocols and thunderbolt protocols. A USB-C connector may also provide power to a connected device. The direct connection between dock 206 and information handling system 202 and the direct connection between the dock and display device 204 may be utilized to wake both the information handling system and the display device. For example, in response to a button being pressed on dock 206, the dock may provide a wake signal to both information handling system 202 and display device 204 via the respective physical communication links.

In an example, the wake signal provided from information handling system 202 to display device 204 via dock 206 may be any suitable in-band communication signal. For example, the wake signal may be transmitted by any in-band communication protocol including, but not limited to, USB1, USB2, USB4, and DisplayPort. The wake signal may be provide over the communication layer of the USB-C communication links.

In certain examples, power delivery controller 212 may provide a vendor defined message (VDM) for display device 204. In an example, VDM communications may be out-of-band communications that may be used to configure display device 204, configure a memory, perform read/write operations, or the like. In previous information handling systems, a dock may not be able to bridge VDMs from one device to anything. In these systems, a dock may be able to receive a VDM from a connected device but did not have the ability to transfer the VDM to another connected device. Information handling system 200 may be improved by one or more components of dock 206 providing a VDM bridge between two connected devices, such as information handling system 202 and display device 204. A dock bridging VDMs between one or more connected devices will be described with respect to FIGS. 3 and 4.

Figure 3:
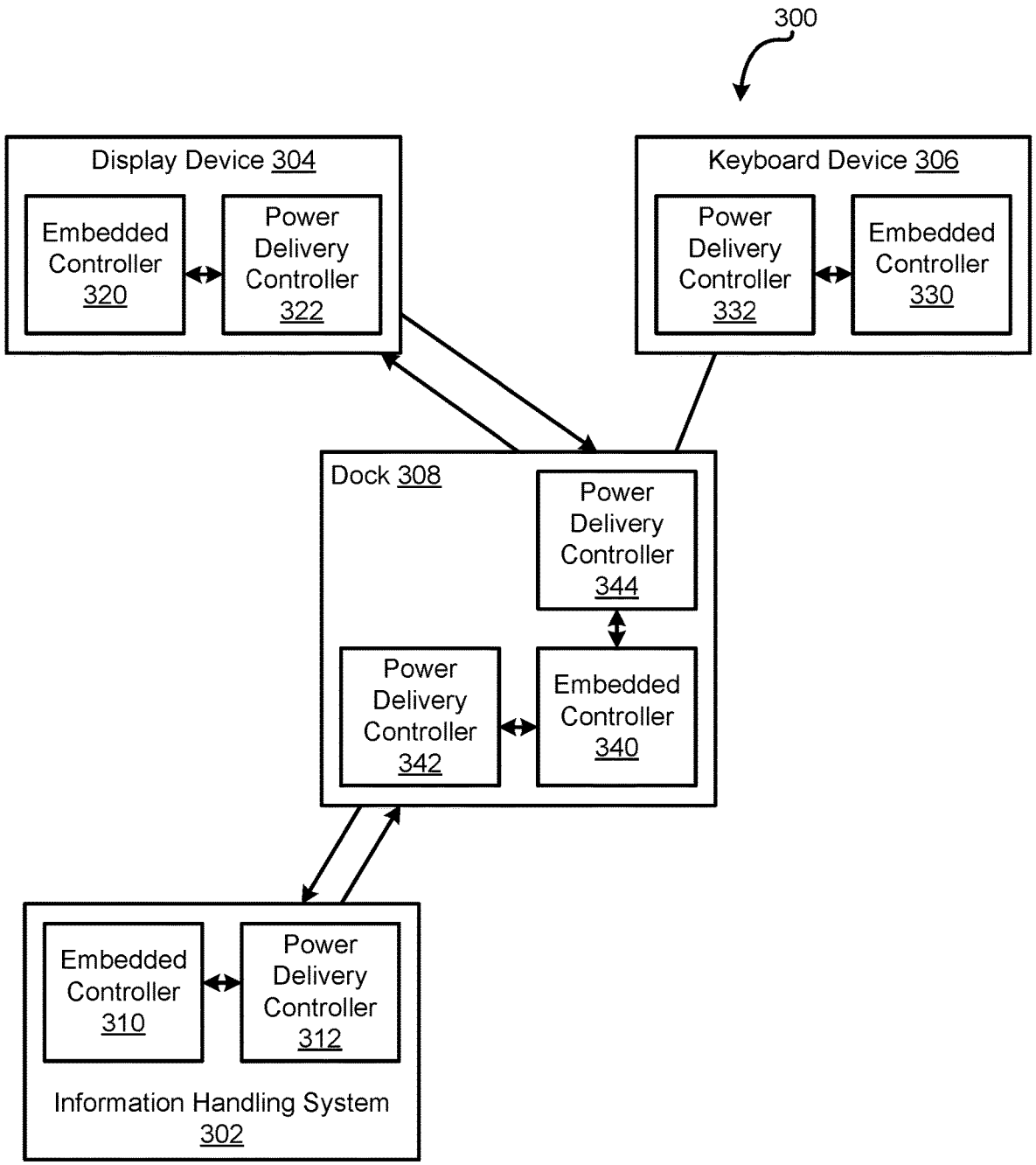
FIG. 3 is a block diagram of a portion of a system including an information handling system, a dock, a display device, and a keyboard device according to at least one embodiment of the disclosure.

FIG. 3 illustrates a portion of a system 300 including an information handling system 302, a display device 304, a keyboard device 306, and a dock 308 according to at least one embodiment of the disclosure. In certain examples, system 300 may be defined as an information handling system, which in turn includes one or more additional information handling systems, such as information handling system 302, display device 304, keyboard device 306, and dock 308. Information handling system 302 may further be referred to herein as a host device to communication with one or more additional devices via dock 308. Information handling system 302 includes an embedded controller 310 and a power delivery controller 312. In an example, information handling system 302 may include additional components over those shown in FIG. 3 without varying from the scope of this disclosure. Display device 304 includes an embedded controller 320 and a power delivery controller 322. In an example, display device 304 may include additional components over those shown in FIG. 3 without varying from the scope of this disclosure. Keyboard device 306 includes an embedded controller 330 and a power delivery controller 332. In an example, keyboard device 306 may include additional components over those shown in FIG. 3 without varying from the scope of this disclosure. Dock 308 includes an embedded controller 340 and power delivery controllers 342 and 344. In an example, dock 308 may include additional components over those shown in FIG. 3 without varying from the scope of this disclosure. While dock 308 may include multiple power delivery controllers, such as power delivery controllers 342 and 344, and multiple ports to communicate with display device 304 and keyboard 306, the dock may include additional power delivery controllers or power delivery controllers 342 and 344 may be combined in a single power delivery controller without varying from the scope of this disclosure. In certain examples, embedded controllers 310, 320, and 340 may be any suitable type of processor without varying from the scope of this disclosure.

In certain examples, information handling system 302, display device 304, and dock 308 may be operate at a low level working layer to transmit the VDMs between the devices while in a "system down" or a "bare-metal" state. In system down state, an operating system (OS) may be installed but the host CPU is down, such as in halted or powered off. In such a system down state, embedded controllers 310, 320, and 340 may operate as out-of-band processing devices to control system hardware. One example of a type of bare-metal information handling system is an information handling system configured with no host OS to boot from, such as may be provided from the factory or assembly plant with no host OS yet installed. A bare-metal information handling system may also be an information handling system that is configured with OS software and firmware, but that is not yet set up for use with proper firmware configurations and credentials for proper operation. In an example, a bare-metal system may also be a decommissioned system in which all firmware and user data, applications and the host OS has been removed, such as by secure delete, from the system drives. Another example of a bare-metal system is a redundant array of independent disks (RAID) system that does not have the proper RAID controller configuration yet installed, such as for virtual disk creation, to allow for OS installation. In an example, such a bare-metal information handling system may have no applications or other user information resident on the main storage of the system, such as hard drive or solid state drive (SDD) containing no data and being only formatted or reformatted, and may in one example have only a hardware configuration agent and/or factory default firmware configurations stored, such as on system persistent storage.

In an example, one or more components within dock 308 may perform any suitable operations to scan or devices connected to the dock. For example, embedded controller 340 may provide one or more pings over the one or more physical communication links connected to dock 308 via power delivery controllers 342 and 344. Power delivery controllers 342 and 344 may receive one or more responses to the pings based on a number of devices connected to dock 308, and may provide the responses to embedded controller 340. In an example, the one or more responses may include identifications for the responding devices, and embedded controller 340 may utilize these identifications to generate a list of connected devices. Embedded controller 340 may store the list of connected devices in any suitable memory, such as memory 104 of FIG. 1. In an example, the list of connected devices may include any suitable devices including, but not limited to, information handling system 302, display device 304, and keyboard device 306.

In certain examples, information handling system 302, display device 304, keyboard device 306, and dock 308 may enter a 'system down' state, such that embedded controllers 310, 320, 330, and 340 may be placed in a lower power sleep state. While information handling system 302, display device 304, keyboard device 306, and dock 308 are in the system down state, power delivery controllers 312, 322, 332, 342, and 344 may remain powered on for transmitting and receiving VDM messages.

During operation, embedded controller 310 may enter a wake state and generate a VDM for one of display device 304 and keyboard 306. In an example, the VDM may be utilized to configure display device 304. Embedded controller 310 may provide the VDM to power delivery controller 312, which in turn may send the VDM to power delivery controller 342 of dock 308 as an out-of-band communication signal over the physical USB-C communication link between information handling system 302 and the dock. In an example, the VDM may identify display device 304 as a destination device for the VDM.

In response to power delivery controller 342 detecting the VDM, the power delivery controller wake embedded controller 340 and the other components of dock 308. Power delivery controller 342 may then analyze the VDM to determine a destination device for the VDM. In an example, power delivery controller 342 may determine display device 304 as the destination device for the VDM. Power delivery controller 342 may notify embedded controller 340 that a VDM has been received and provide the embedded controller with the identifier of display device 304 as the destination device.

Embedded controller 340 may then perform one or more suitable operations to determine whether display device 304 is connected to dock 308. Embedded controller 340 may determine whether the destination device is connected to dock may be made in any suitable manner including, but not limited to, comparing the identifier to identifiers in the list of connected devices, scanning connected devices for the destination devices, and sending a ping signal to the destination device. If the identifier for display device 304 is not in the list of connected devices, embedded controller may scan all devices connected to dock 308 as described above. If the identifier for display device 304 is not in the list of connected devices, embedded controller 340 may provide a ping to display device 304 to determine whether the display device is still connected to dock 308. If a response to the ping is not received, display device 304 is no longer connected to dock 308 and embedded controller 340 may update the list of connected devices to remove the identifier of the display device.

In response to embedded controller 340 receiving a response to the ping, display device 304 is still connected to dock 308 and one or more suitable operations may be performed to send the VDM to display device 304. For example, power delivery controller 342 designate embedded controller 340 as a virtual destination for the VDM. In an example, power delivery controller 342 may create a virtual link between the power delivery controller and embedded controller 340 to pass the message and/or commands within the VDM to the embedded controller. The message and/or commands may be passed to embedded controller 340 by power delivery controller 342 converting the VDM to a second message having a different protocol as the VDM and providing the second message to the embedded controller via the virtual link between power delivery controller 342 and the embedded controller. In an example, the message protocol for the second message may be any suitable protocol including, but not limited to, an inter-integrated circuit protocol.

In response to receiving the message and/or command of the VDM in the second message, embedded controller 340 may create a virtual link between the embedded controller and power delivery controller 344 to provide the second message to power delivery controller 344. Embedded controller 340 may then provide the second message to power delivery controller 344 via created virtual link. In response to the receiving the second message, power delivery controller 344 may regenerate the second message as a VDM including the message and/or commands from the original VDM. Power delivery controller 344 may then provide the VDM to display device 304 via the USB-C physical communication link between dock 308 and the display device. In response to power delivery controller 322 detecting the VDM, the power delivery controller wake embedded controller 320 and the other components of display device 304 so that these components may process the message and/or commands o the VDM. As described above, embedded controller 340 and power delivery controller 342 and 344 may perform any suitable operations to convert a received VDM to pass a message and/or commands over virtual links created in dock 308, and regenerate the VDM to pass the VDM to a destination device.

Figure 4:
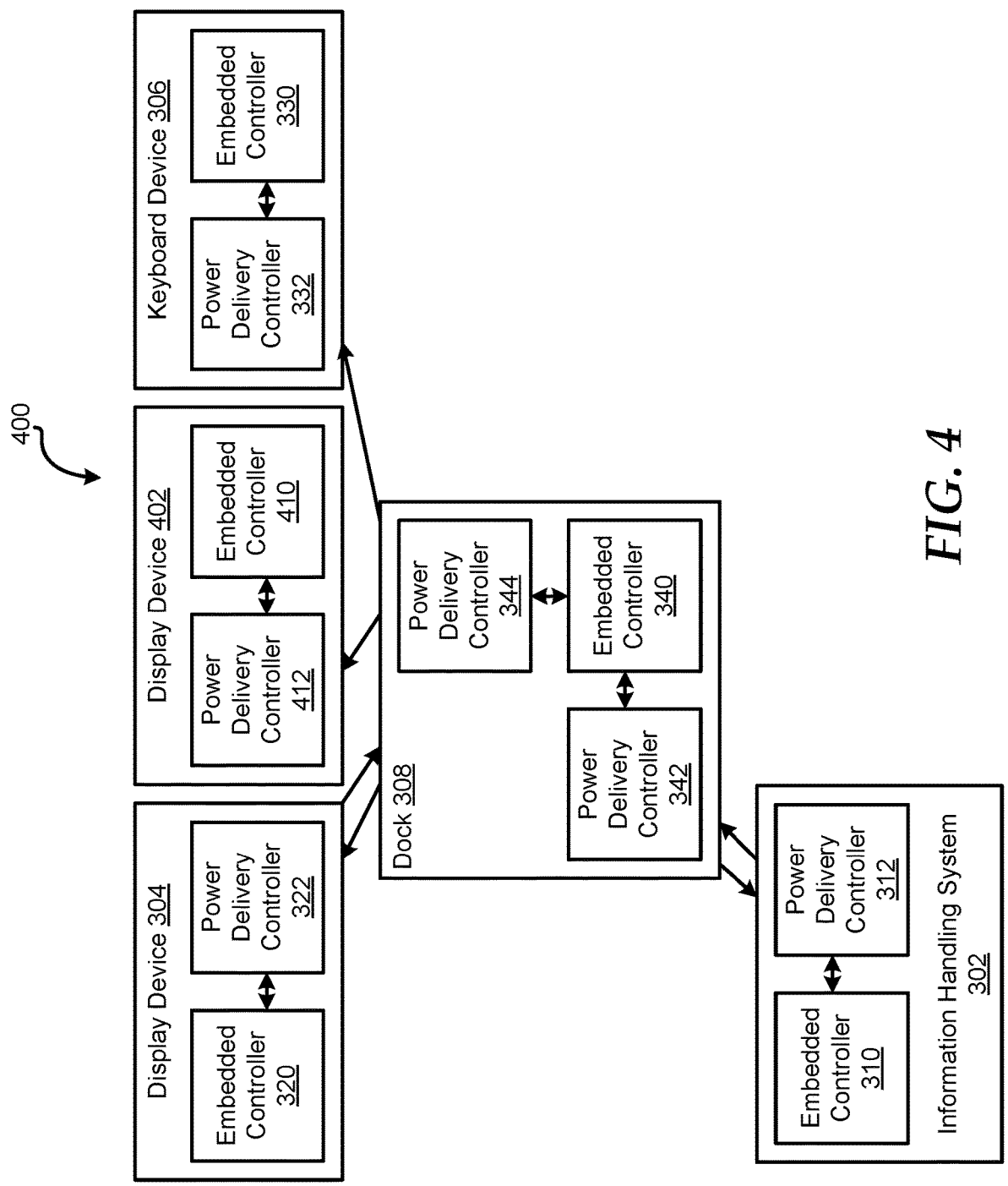
FIG. 4 is a block diagram of a portion of a system including an information handling system, a dock, multiple display devices, and a keyboard device according to at least one embodiment of the disclosure.

FIG. 4 illustrates a portion of a system 400 including a display device 402, information handling system 302, display device 304, a keyboard device 306, and dock 308 according to at least one embodiment of the disclosure. In certain examples, system 400 may be defined as an information handling system, which in turn includes one or more additional information handling systems, such as information handling system 302, display devices 304 and 402, keyboard device 306, and dock 308. Information handling system 302, display device 304, keyboard 306, and dock 308 may be substantially similar to those described above with respect to FIG. 3. Display device 402 includes an embedded controller 410 and a power delivery controller 412. In an example, display device 402 may include additional components over those shown in FIG. 4 without varying from the scope of this disclosure. While dock 308 may include multiple power delivery controllers, such as power delivery controllers 342 and 344, and multiple ports to communicate with display device 304 and keyboard 306, the dock may include additional power delivery controllers or power delivery controllers 342 and 344 may be combined in a single power delivery controller without varying from the scope of this disclosure. In certain examples, embedded controllers 310, 320, 340, and 410 may be any suitable type of processor without varying from the scope of this disclosure.

In certain examples, information handling system 302, display devices 304 and 402, keyboard device 306, and dock 308 may enter a 'system down' state, such that embedded controllers 310, 320, 330, 340, and 410 may be placed in a lower power sleep state. While information handling system 302, display devices 304 and 402, keyboard device 306, and dock 308 are in the system down state, power delivery controllers 312, 322, 332, 342, 344, and 412 may remain powered on for transmitting and receiving VDM messages.

During operation, embedded controller 310 may enter a wake state and generate a broadcast VDM for all of the devices connected to dock 308, such as display devices 304 and 402, and keyboard 306. Embedded controller 310 may provide the broadcast VDM to power delivery controller 312, which in turn may send the broadcast VDM to power delivery controller 342 of dock 308 as an out-of-band communication signal over the physical USB-C communication link between information handling system 302 and the dock. In an example, the broadcast VDM may identify display device 304 and 402, and keyboard device 306 as the destination devices for the broadcast VDM.

In response to power delivery controller 342 detecting the VDM, the power delivery controller wake embedded controller 340 and the other components of dock 308. Power delivery controller 342 then may analyze the VDM to determine whether the VDM is a broadcast message. For example, power delivery controller 342 may determine each of display devices 304 and 402, and keyboard device 306 as the destination devices for the VDM. Power delivery controller 342 may notify embedded controller 340 that a broadcast VDM has been received and provide the embedded controller with the identifiers of display devices 304 and 402, and keyboard device 306 as the destination devices.

In an example, embedded controller 340 and power delivery controllers 342 and 344 may perform the operations described above with respect to FIG. 3 to convert the broadcast VDM to another message including the message and/or commands. Similarly, embedded controller 340 and power delivery controllers 342 and 344 may perform the operations described above with respect to FIG. 3 to create virtual links within dock 308 to pass the message and/or commands from the broadcast VDM among the embedded controller and power delivery controllers. Power delivery controller 344 may perform the operations described above with respect to FIG. 3 to regenerate the VDM including the message and/or commands from the original VDM. Power delivery controller 344 may then provide the broadcast VDM to each of display devices 304 and 402, and keyboard device 306 via the USB-C physical communication links between dock 308 and the display devices and keyboard device. In response to power delivery controller 322 detecting the VDM, the power delivery controller wake embedded controller 320 and the other components of display device 304 so that these components may process the message and/or commands o the VDM. In response to power delivery controller 332 detecting the VDM, the power delivery controller wake embedded controller 330 and the other components of keyboard device 306 so that these components may process the message and/or commands o the VDM. In response to power delivery controller 412 detecting the VDM, the power delivery controller may wake embedded controller 410 and the other components of display device 402 so that these components may process the message and/or commands o the VDM.

While FIGS. 3 and 4 have been described with respect to information handling system 302 providing a VDM to one or more of display devices 304 and 402 and keyboard device 306, the operations described herein may be performed in substantially the same manner with respect to VDM provide from one of the display devices or the keyboard device to the information handling system without varying from the scope of this disclosure. In certain examples, the operations performed by dock 308 may be performed by one of display devices 304 and 402 when a daisy chain functionality between the display devices is supported within information handling system 300 without varying from the scope of this disclosure.

Figure 5:
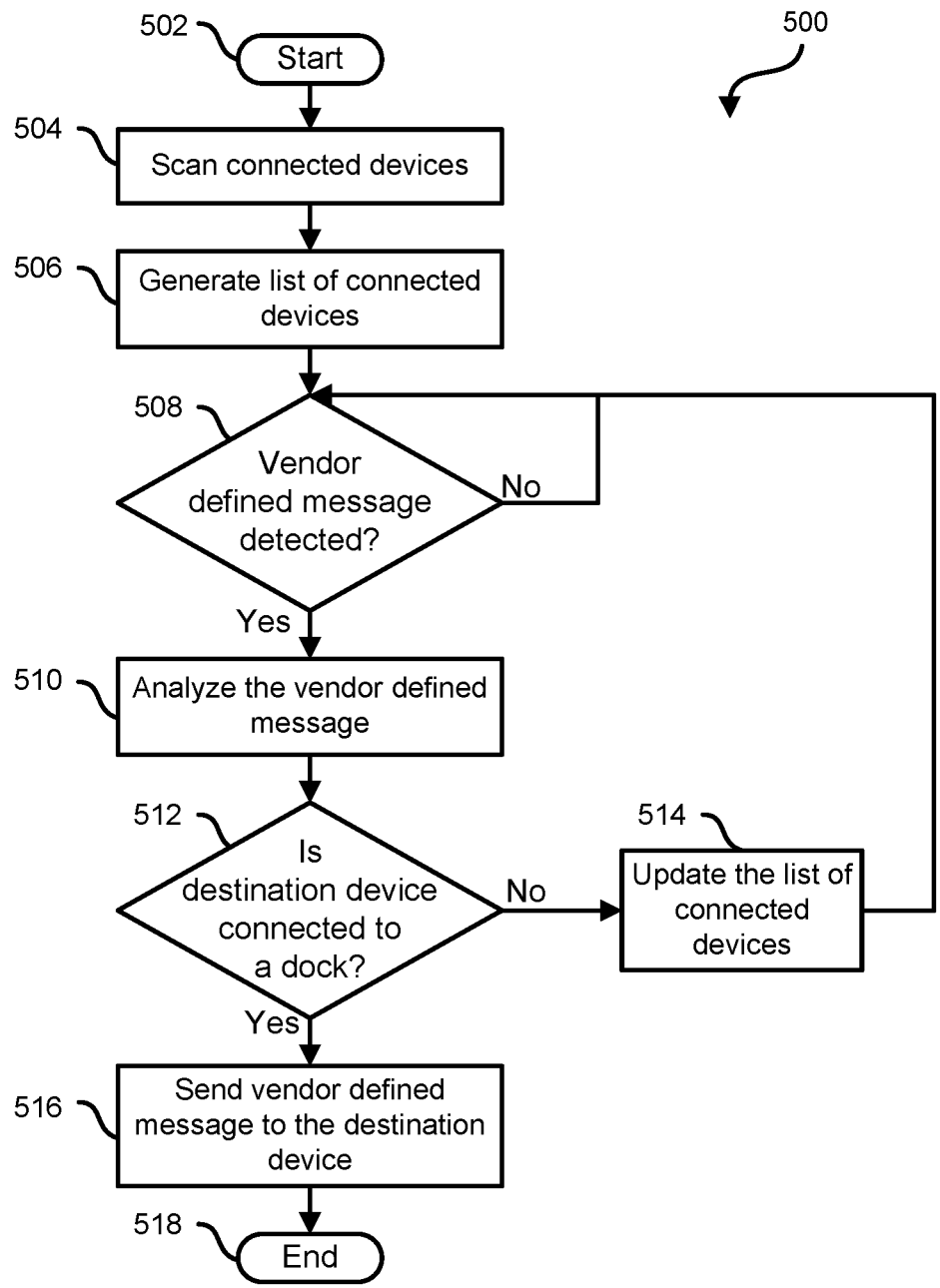
FIG. 5 is a flow diagram of a method for providing a vendor defined message from an information handling system to one or more devices via a dock according to at least one embodiment of the current disclosure.

FIG. 5 illustrates a method 500 for providing a vendor defined message from an information handling system to one or more devices via a dock according to at least one embodiment of the current disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, dock 206 depicted in FIG. 2, dock 308 depicted in FIGS. 3 and 4, or any other type of system, controller, device, module, processor, or any combination thereof, operable to employ all, or portions of, the method of FIG. 5.

At block 504, connected devices are scanned. In an example, connected devices may be any suitable device including, but not limited to, an information handling system, such as a computer, a display device, and a keyboard device. In certain examples, the connected devices may be directly connected to a dock via any suitable physical communication link, such as a universal serial bus type C (USB-C) communication cable or link. In an example, a USB-C connector may communicate data in different protocols including, but not limited to, USB protocols and thunderbolt protocols. A USB-C connector may also provide power to a connected device. At block 506, a list of connected devices is generated. At block 508, a determination is made whether a vendor defined message (VDM) is received from a device connected to the dock. In an example, the dock may receive the VDM from the information handling system. In certain examples, VDM communications may be out-of-band communications that may be used to configure devices connected to a dock, configure a memory, perform read/write operations, or the like.

In response to a VDM being detected, the VDM is analyzed at block 510. In an example, the VDM may be analyzed in any suitable manner including, but not limited to, determine a destination device for the VDM. For example, the destination device may be one or more display devices, a keyboard device, or the like. In certain examples, the VDM may be a direct message identifying only one destination device, may be a broadcast message identifying multiple destination devices, or the like. At block 512, a determination is made whether the destination device is connected to the dock. The determination of whether the destination device is connected to the dock may be made in any suitable manner including, but not limited to, scanning connected devices for the destination devices, and sending a ping signal to the destination device. If the destination device is not connected to the dock, the list of connected devices is updated at block 514 and the flow continues as stated at block 508.

In response to the destination device being connected to the dock, the VDM is sent to the destination device at block 516, and the flow ends at block 518. In an example, the dock may perform one or more suitable operations to send the VDM to the destination device. For example, a power delivery controller may receive the VDM from the information handling system, and designate an embedded controller of the dock as a virtual destination for the VDM. In an example, the power delivery controller may convert the VDM to a second message type having a different protocol as the VDM and may provide the second message to the embedded controller via the first virtual link. The embedded controller may then provide the second message to a second power delivery controller via a second virtual link of the embedded controller. In response to the receiving the second message, the second power delivery controller may regenerate the second message as a second VDM provide the second VDM to the destination device via a physical communication link between the dock and the destination device.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
 a first device;
 a host device; and
 a dock to communicate with the first device over a first physical communication link, and to communicate with the host device over a second physical communication link, the dock to:
   receive a vendor defined message from the host device over the second physical communication link, wherein the first device is designated as a recipient of the vendor defined message;
   in response to the first device being a destination device for the vendor defined message, convert the vendor defined message to a second message having a protocol different than the vendor defined message and designate an embedded controller of the dock as a virtual destination for the second message;
provide the second message to the embedded controller via a first virtual link;
determine that the first device is the destination device and is in communication with the dock;
in response to the first device being in communication with the dock, regenerate the second message as a second vendor defined message; and
provide the second vendor defined message to the first device via the first physical communication link.

2. The information handling system of claim 1, further comprising:
a third device to communicate with the dock over a third physical communication link; and
in response to the third device being a second destination device, the embedded controller to broadcast the second vendor defined message to both the first device and the third device.

3. The information handling system of claim 1, wherein the dock further includes:
a power delivery controller to communicate with the first device via the first physical communication link, the power delivery controller to detect the vendor defined message while in the dock is in a sleep state, and to wake the embedded controller in response to detecting the vendor defined message.

4. The information handling system of claim 3, wherein the protocol of the second message is an inter-integrated circuit protocol to provide the communication over the first virtual link created between the power delivery controller and the embedded controller.

5. The information handling system of claim 1, wherein the embedded controller to determine one or more devices in communication with the dock, and to generate a list of connected devices including the one or more devices in communication with the dock.

6. The information handling system of claim 5, wherein in response to the first device not being in communication with the dock, the embedded controller to update the list of connected devices to remove the first device from the list of connected devices.

7. The information handling system of claim 1, wherein the first and second physical communication links are universal serial bus type C links.

8. The information handling system of claim 1, wherein vendor defined message is an out-of-band communication message provided over the first physical communication link.

9. A method comprising:
receiving, by a dock, a vendor defined message from a first device over a first physical communication link, wherein a second device is designated as a recipient of the vendor defined message;
in response to the second device being a destination device for the vendor defined message, converting, by a power delivery controller of the dock, the vendor defined message to a second message having a different protocol than the vendor defined message and designating an embedded controller of the dock as a virtual destination for the second message;
providing the second message to the embedded controller via a first virtual link;
determining that the second device is the destination device and is in communication with the dock;
in response to the second device being in communication with the dock, regenerating the second message as a second vendor defined message; and
providing the second vendor defined message to the second device via a second physical communication link.

10. The method of claim 9, further comprising:
determining a third device is in communication with the dock over a third physical communication link; and
in response to the third device being a second destination device, broadcasting, by the embedded controller, the second vendor defined message to both the first device and the third device.

11. The method of claim 9, further comprising:
detecting, by a power delivery controller of the dock, the vendor defined message while in the dock is in a sleep state; and
waking the embedded controller in response to detecting the vendor defined message.

12. The method of claim 9, wherein the protocol of the second message is an inter-integrated circuit protocol to provide the communication over the first virtual link created between the power delivery controller and the embedded controller.

13. The method of claim 9, further comprising:
determining one or more devices in communication with the dock; and
generating a list of connected devices including the one or more devices in communication with the dock.

14. The method of claim 13, further comprising:
in response to the first device not being in communication with the dock, updating the list of connected devices to remove the first device from the list of connected devices.

15. The method of claim 9, wherein the first and second physical communication links are universal serial bus type C links.

16. The method of claim 9, wherein vendor defined message is an out-of-band communication message provided over the first physical communication link.

17. An information handling system comprising:
an embedded controller;
a first power delivery controller to communicate with a first device of the information handling system via a first physical communication link, and with the embedded controller via a first virtual link; and
a second power delivery controller to communicate with a host device of the information handling system via a second physical communication link, and with the embedded controller via a second virtual link, the second power delivery controller to:
receive a vendor defined message from the host device over the second physical communication link, wherein the first device is designated as the recipient of the vendor defined message;
if the first device is a destination device for the vendor defined message, then convert the vendor defined message to a second message having a different protocol and designate the embedded controller as a virtual destination for the second message; and
provide the second message to the embedded controller via the first virtual link;
in response to receiving the second message via the first virtual link, the embedded controller to:
determine that the first device is the destination device and is in communication with the information handling system;

regenerate the second message as a second vendor defined message;

provide the second vendor defined message to the second power delivery controller via the second virtual link; and in response to receiving the second vendor defined message, the second power delivery controller to provide the second vendor defined message to the first device via the second physical communication link.

18. The information handling system of claim 17, further comprising:

a third power delivery controller to communicate with a second device over a third physical communication link; and in response to the second device being a second destination device, the embedded controller to broadcast the second vendor defined message to both the first device and the third device.

19. The information handling system of claim 17, wherein the first power delivery controller to detect the vendor defined message while in the information handling system is in a sleep state, and to wake the embedded controller in response to detecting the vendor defined message.

20. The information handling system of claim 17, wherein the protocol of the second message is an inter-integrated circuit protocol to provide the communication over the first virtual link created between the power delivery controller and the embedded controller.

* * * * *